(12) United States Patent   (10) Patent No.: US 7,857,264 B2
Carter                      (45) Date of Patent: Dec. 28, 2010

(54) MOUNTING ASSEMBLY

(75) Inventor: Neal L S Carter, Derby (GB)

(73) Assignee: Rolls-Royce, PLC, London (GB)

( * ) Notice: Subject to any disclaimer, the term of this patent is extended or adjusted under 35 U.S.C. 154(b) by 0 days.

(21) Appl. No.: 12/453,760

(22) Filed: May 21, 2009

(65) Prior Publication Data

US 2010/0012797 A1 Jan. 21, 2010

(30) Foreign Application Priority Data

Jul. 21, 2008 (GB) ................... 0813229.2

(51) Int. Cl.
  *F16L 3/08* (2006.01)
(52) U.S. Cl. .................... 248/65; 248/68.1; 248/74.1
(58) Field of Classification Search ............ 248/65, 248/68.1, 74.1, 74.2, 58, 62
  See application file for complete search history.

(56) References Cited

U.S. PATENT DOCUMENTS 3,547,385 A * 12/1970 Kindorf et al. ............. 248/62
4,960,253 A * 10/1990 Perrault et al. ............ 248/68.1
5,876,000 A * 3/1999 Ismert ...................... 248/65
5,971,329 A * 10/1999 Hickey ...................... 248/68.1
2004/0206855 A1* 10/2004 Caveney et al. ............ 248/68.1
2007/0007396 A1* 1/2007 Wien et al. .................. 248/68.1
2007/0246614 A1* 10/2007 Allmann et al. .............. 248/65

FOREIGN PATENT DOCUMENTS

DE        39 39 103 A1    5/1991

* cited by examiner

*Primary Examiner*—Ramon O Ramirez
(74) *Attorney, Agent, or Firm*—Oliff & Berridge, PLC

(57) ABSTRACT

A mounting assembly for mounting two generally parallel elongated members (such as pipes) in close proximity to each other and to an adjacent surface. The mounting assembly is so arranged that the elongated members are permitted a limited degree of freedom of movement in an axial direction. Additionally, the mounting assembly is so arranged that the elongated members may be readily secured and released therefrom. The mounting assembly includes a mounting component for securing a respective elongated member to a bracket, each mounting component including a mounting part mounted to the front side of the bracket, a containment part that defines, in conjunction with the front side of the bracket, a loop through which the elongated member extends, and a holding part that extends through an opening in the front side of the bracket to a rear side of the bracket, such that the mounting part and the first holding part extend from different sides of the containment part.

20 Claims, 3 Drawing Sheets

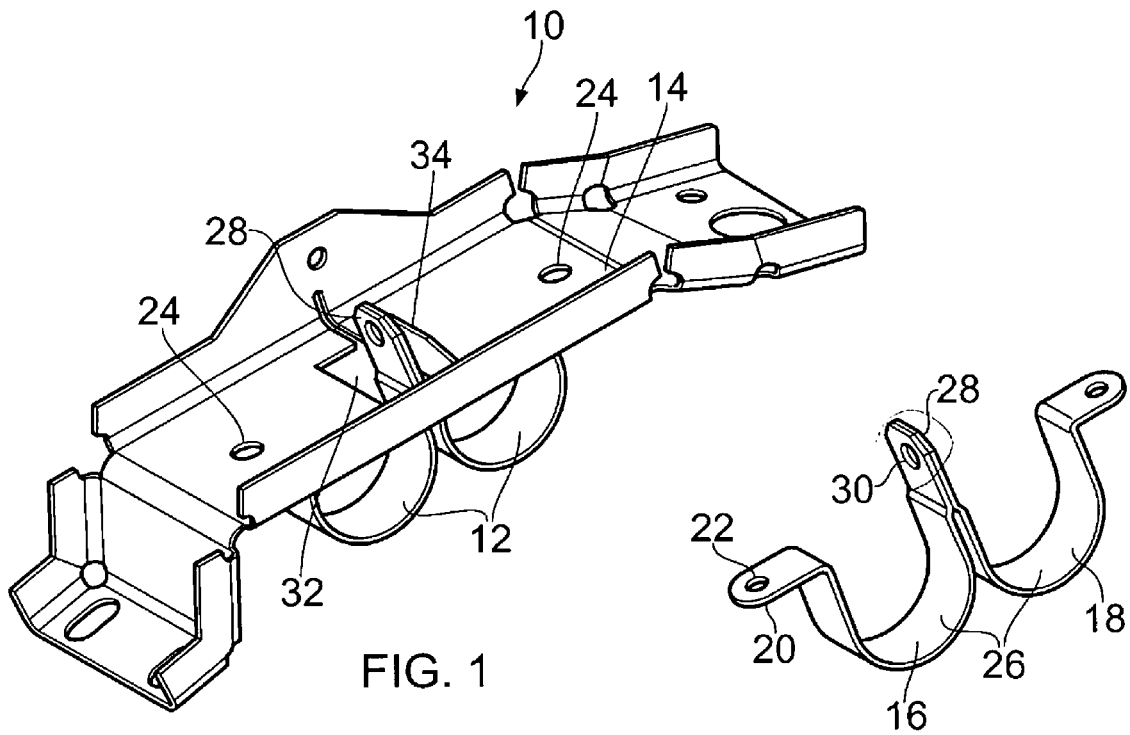
FIG. 1
FIG. 2
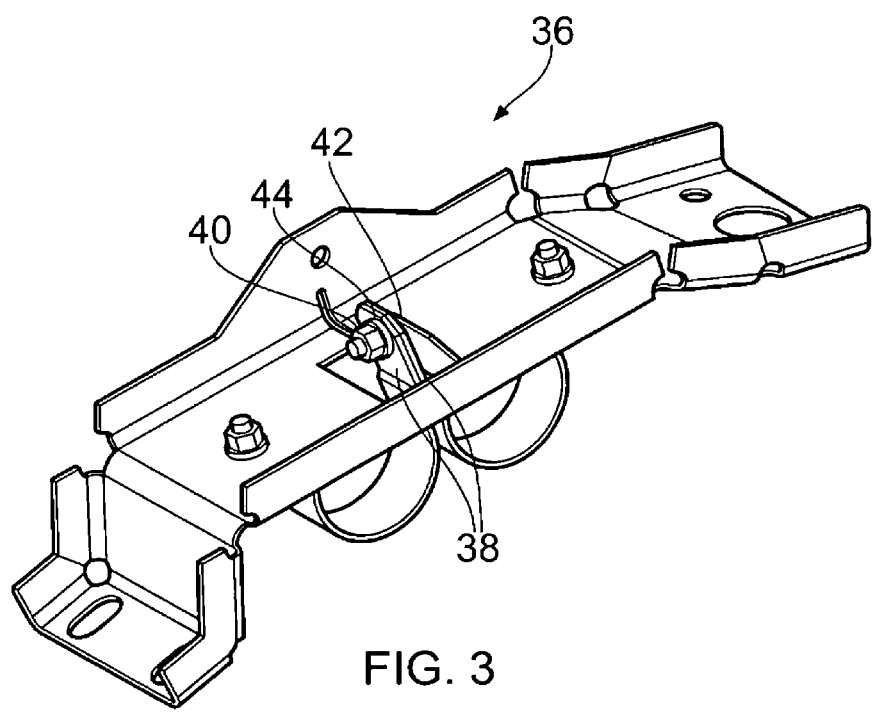
FIG. 3

MOUNTING ASSEMBLY

BACKGROUND

This invention is directed to a mounting assembly for mounting two elongated members in close proximity to each other.

It is often required to mount two or more generally parallel pipes or other elongated members to a surface or other fixture in close proximity to each other. Such mountings should generally allow the pipes a certain amount of freedom of movement, particularly in an axial direction, while also maintaining the pipes close to the fixture. It is further desirable for the mounting to be operably capable of being readily secured and released, as desired.

Prior arrangements have often not proved wholly satisfactory. For instance, in one arrangement, two adjacent "P" shaped brackets have been used with only the stems of the P's being mounted to the fixture. However, such mounting is undesirable because it tends to sag away from the fixture.

SUMMARY

According to the present invention there is disclosed a mounting assembly for mounting two generally parallel first and second elongated members, the mounting assembly including: a bracket that allows the first and second elongated members to extend substantially against a front side of the bracket; a first mounting component that engages with the first elongated member, the first mounting component including: a first mounting part mounted to the front side of the bracket, a first containment part that defines, in conjunction with the front side of the bracket, a loop through which the first elongated member extends, and a first holding part that extends through an opening in the front side of the bracket to a rear side of the bracket, such that the first mounting part and the first holding part extend from different sides of the first containment part; a second mounting component that engages with the second elongated member, the second mounting component including: a second mounting part mounted to the front side of the bracket, a second containment part that defines, in conjunction with the front side of the bracket, a loop through which the second elongated member extends, and a second holding part that extends through the opening in the front side of the bracket to the rear side of the bracket, such that the second mounting part and the second holding part extend from different sides of the second containment part.

A retaining means may be provided for retaining the first and second holding parts on the rear side of the bracket.

In a first embodiment, the retaining means interconnects the first and second holding means of the first and second mounting components. Further, the first and second mounting components may each include aligning formations, and a fastening means may be provided such that the fastening means is capable of being engaged with the aligning formations.

In a second embodiment, the retaining means permanently joins the first and second holding parts on the rear side of the bracket. A tab formation may also be provided on the rear side of the bracket to which the retaining means can be fastened.

In a third embodiment, the retaining means includes an opening in the bracket, wherein the opening in the bracket has a central portion through which heads of the first and second holding parts extend, and the opening in the bracket has an outer portion with which the first and second holding parts engage, but through which the first and second holding parts cannot extend. Additionally, the retaining means may be spring urged to engage with the outer portion of the opening in the bracket. Further, the central portion of the opening in the bracket may be in the form of a slot.

Regarding any of the three aforementioned embodiments, the first and second containment parts may be substantially arcuate. A hole or other formation may also be provided in the first and second holding parts to facilitate manipulation of the retaining means.

The first and second mounting parts are configured to lie substantially flat against the front side of the bracket, and the first and second mounting parts each include a hole such that each hole aligns with a corresponding hole in the bracket.

The first and second holding parts may be provided with deformable formations that allow the first and second holding parts to be urged through the opening in the front side of the bracket, but prevent the first and second holding parts from being removed from the opening in the bracket.

The assembly may further include a third mounting component that engages with a third elongated member that lies generally parallel to and between the first and second elongated members, the third mounting component including: a third containment part that defines, in conjunction with the front side of the bracket, a loop through which the third elongated member extends, a third holding part that extends through the opening in the front side of the bracket to the rear side of the bracket, and a fourth holding part that extends through the opening in the front side of the bracket to the rear side of the bracket, such that the third holding part and the fourth holding part extend from different sides of the third containment part.

BRIEF DESCRIPTION OF THE DRAWINGS

FIG. 1 is a perspective view from beneath of a first mounting assembly according to the invention;

FIG. 2 is a perspective view from beneath of a component of the assembly of FIG. 1;

FIG. 3 is a perspective view from beneath of a second mounting assembly according to the invention;

DETAILED DESCRIPTION OF EMBODIMENTS

Figure 4:
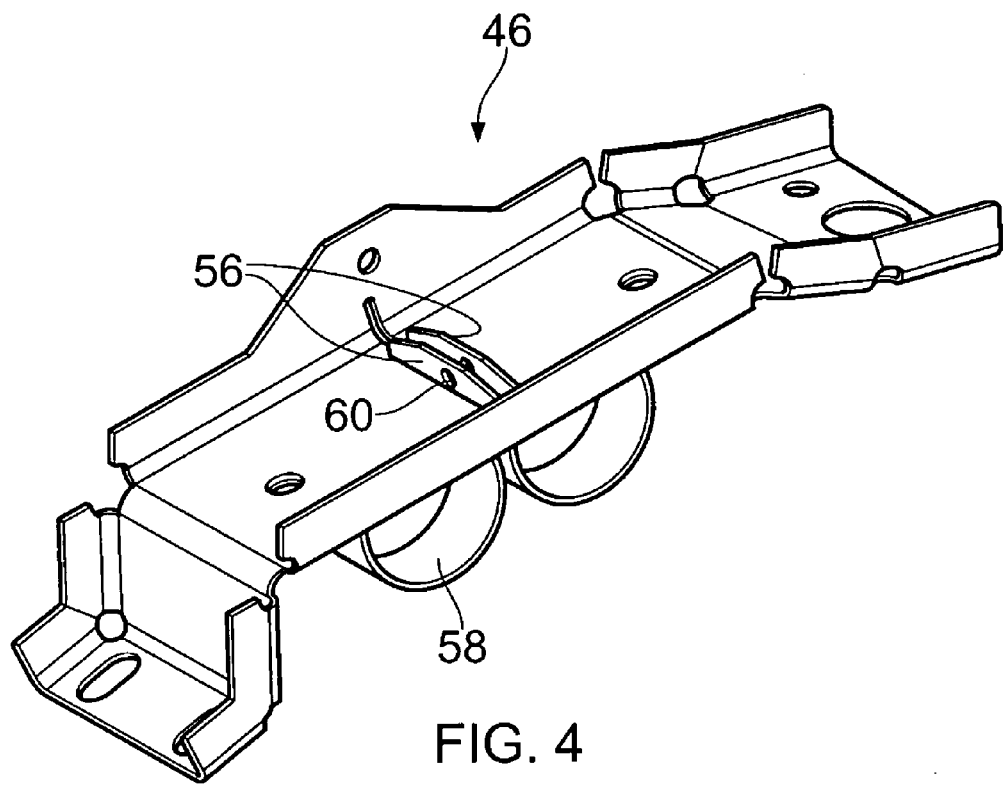
FIG. 4 is a perspective view from beneath of a third mounting assembly according to the invention.

FIGS. 1 and 2 show a first mounting assembly 10 suitable for mounting two adjacent elongated members 12 (not shown). The members 12 could be pipes or other elongated structures.

The mounting assembly 10 includes a bracket 14 which is a profiled length of channel section, with the elongated members 12 mounted on the underside of the channel (mounted on the front side of the bracket). The mounting assembly also includes first and second mounting components 16, 18. Each mounting component 16, 18 includes a mounting part 20 in the form of a web that is capable of being mounted to the front side of the bracket 14. A hole 22 is provided in the mounting part 20 for engaging with a corresponding hole 24 in the bracket 14. Fastening means (shown in FIG. 3) such as a nut and bolt can be provided so as to extend through the holes 22, 24 and secure the mounting parts 22 to the bracket 14.

A containment part 26, having a substantially "n" shape (substantially arcuate), extends perpendicularly from the mounting part 20 and away from the bracket 14. The containment part 26 is of a size to slidingly receive an elongated member 12.

A holding part 28 extends from a different end of the containment part 26 than the mounting part 20 and is in the form of a swaged end with a through hole 30. In the first embodiment, the holding parts 28 of the first and second mounting components 16, 18 are welded together with their through holes 30 aligned. An opening 32 is provided through the bracket 14 through which the holding parts 28 extend. The opening 32 is formed by folding back a tab 34, the tab having a hole that is able to be aligned with the through holes 30, and through which an appropriate fastening means can be provided to retain the holding parts 28 in position.

Accordingly, there is disclosed a mounting assembly which provides support on each side of the elongated members while also allowing the elongated members to remain in close proximity to each other. The mounting assembly can further be readily secured or released as required.

FIG. 3 shows a second mounting assembly 36 which is similar to the first mounting assembly 10. In the second embodiment, however, the holding parts 38 are not permanently connected, but rather can be connected by a nut and bolt 40, 42 as shown, with a spacer 44 provided between the nut 40 and the bolt 42.

Figure 5:
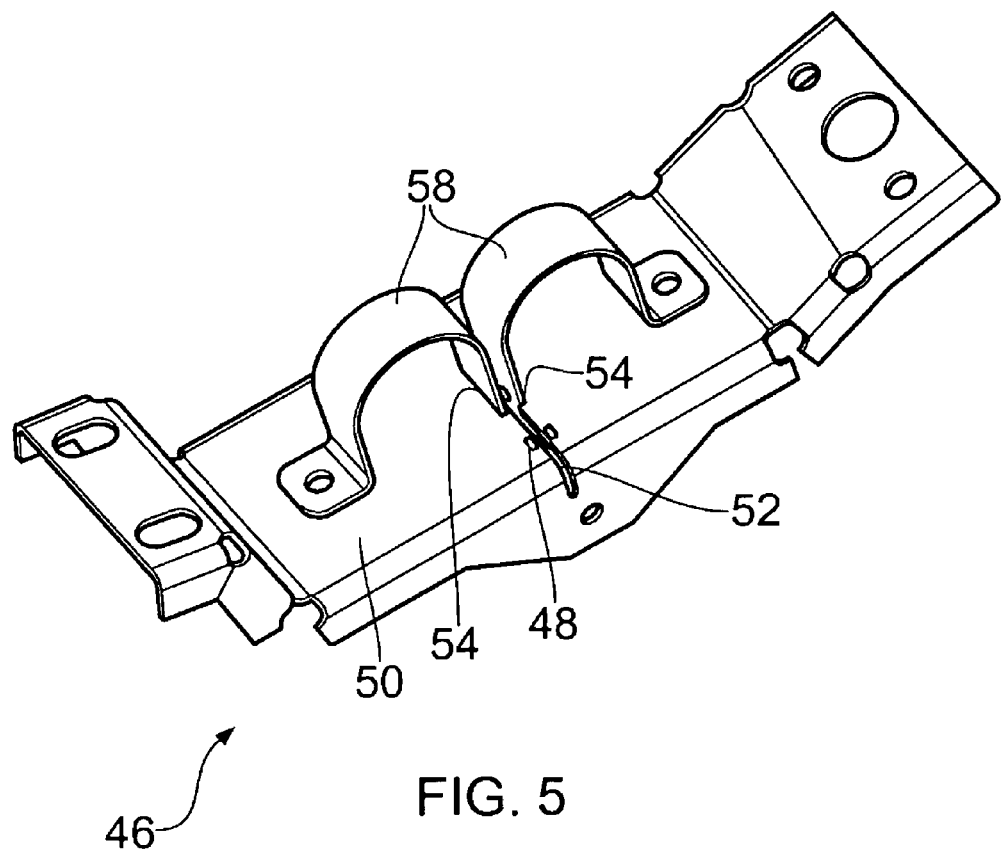
FIG. 5 is a perspective view from above of the mounting assembly according to FIG. 4.

FIGS. 4 and 5 show a third mounting assembly 46 which is also similar to the first mounting assembly 10. In the third embodiment, however, a different opening 48 is provided in the bracket 50. The opening 48 is in the form of a slot 54 with cut out portions 52 extending on each side of the slot 54 for a short distance. The holding parts 56 have heads, wherein the heads of the holding parts 56 are capable of being extended through the slot 54 that is located at a central portion of the bracket 50. However, the rest of each holding part 56 is too wide to pass through the slot 54.

Accordingly, the heads of the holding parts 56 can be spring urged to engage beneath the slot 54, and also urged to such a position by the containment parts 58. By contrast, the rest of each holding part 56 is engaged with the cut out portions 52, but does not extend through either the slot 54 or the cut out portions 52. Holes 60 may also be provided in the holding parts 56 to further facilitate manipulation of the retaining means.

The third mounting assembly 46 may therefore require less fastening means and can thus be assembled and disassembled faster and with less tooling.

Figure 6:
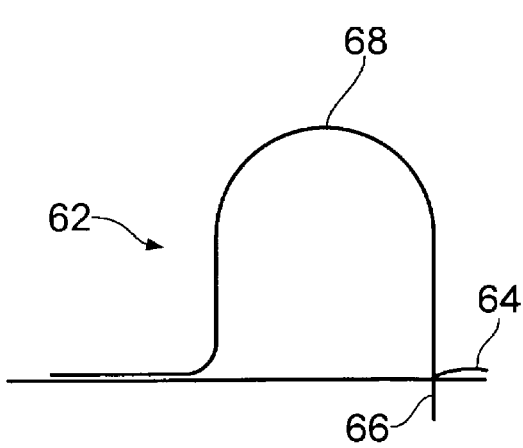
FIG. 6 is a diagrammatic side view through part of a fourth mounting assembly according to the invention.
Figure 7:
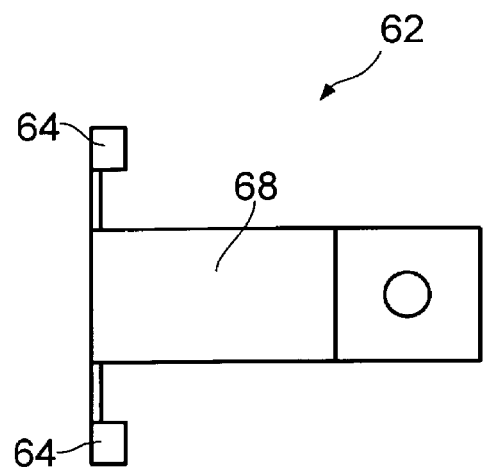
FIG. 7 is a view from above of part of the assembly of FIG. 6.

FIGS. 6 and 7 diagrammatically show part of a fourth mounting assembly 62. In this embodiment, two tangs 64 are provided on each holding part 66 of each mounting component 68. The tangs 64 are curved upwardly and tensioned such that they can be pulled through an opening in the bracket, but thereafter cannot be removed from the opening in the bracket.

Figure 8:
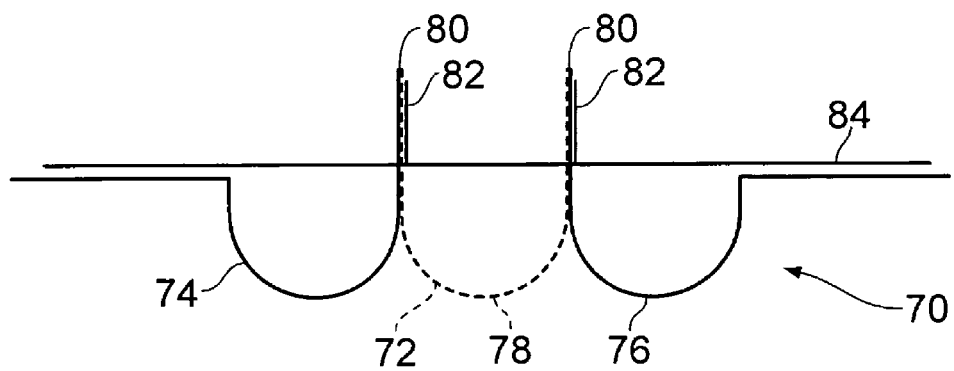
FIG. 8 is a diagrammatic end view of a fifth mounting assembly according to the invention.

FIG. 8 diagrammatically shows a fifth mounting assembly 70 for mounting three elongated members (not shown). In this embodiment, a third mounting component 72 is provided between the first and second mounting components 74, 76. The third mounting component 72 has a containment part 78 with two holding parts 80 extending therefrom. The holding parts 80 may be connected to respective holding parts of the first and second components 74, 76, and may also be fastened to respective tabs 82 on the rear side of the bracket 84.

Figure 9:
FIGS. 9 and 10 are respectively diagrammatic side views of alternative components of mounting assemblies according to the invention.
Figure 10:

FIGS. 9 and 10 show mounting components with alternative profiles for the containment parts 86, 88 that may be used for mounting different shaped elongated members. Such elongated members may be different shaped pipes, or other forms of cabling or trunking.

As described above, the present invention discloses mounting assemblies for securing adjacent elongated members, the mounting assemblies providing a number of significant advantages relative to existing mounting assemblies. The mounting assemblies according to the present invention securely mount together two or more elongated members, while also readily permitting securing or releasing of the respective mounting assemblies.

Although the embodiments of the present invention have been described in detail, it will be understood that the present invention is not limited to the above-described embodiments, and various modifications may be made without departing from the scope of the present invention. For example, any of the above features can be combined as required; the elongated members may take different shapes; the brackets may be differently formed; or other fastening means may be used in conjunction with the retaining means.

What is claimed is:

1. A mounting assembly for mounting two generally parallel first and second elongated members, the mounting assembly comprising:
   a bracket that allows the first and second elongated members to extend substantially against a front side of the bracket;
   a first mounting component that engages with the first elongated member, the first mounting component including:
      a first mounting part mounted to the front side of the bracket,
      a first containment part that defines, in conjunction with the front side of the bracket, a loop through which the first elongated member extends, and
      a first holding part that extends through an opening in the front side of the bracket to a rear side of the bracket, such that the first mounting part and the first holding part extend from different sides of the first containment part;
   a second mounting component that engages with the second elongated member, the second mounting component including:
      a second mounting part mounted to the front side of the bracket,
      a second containment part that defines, in conjunction with the front side of the bracket, a loop through which the second elongated member extends, and
      a second holding part that extends through the opening in the front side of the bracket to the rear side of the bracket, such that the second mounting part and the second holding part extend from different sides of the second containment part; and
   a retaining means that includes the first and second holding parts and is configured to retain the first and second holding parts on the rear side of the bracket by interconnecting the first and second holding parts.

2. The mounting assembly according to claim 1, wherein the first and second mounting components each include aligning formations, and
   a fastening means is provided such that the fastening means is capable of being engaged with the aligning formations.

3. The mounting assembly according to claim 1, wherein a tab formation is provided on the rear side of the bracket to which the retaining means can be fastened.

4. The mounting assembly according to claim 1, wherein a hole or other formation is provided in the first and second holding parts to facilitate manipulation of the retaining means.

5. The mounting assembly according to claim 1, wherein the first and second containment parts are substantially arcuate.

6. The mounting assembly according to claim 1, wherein the first and second mounting parts are configured to lie substantially flat against the front side of the bracket, and the first and second mounting parts each include a hole such that each hole aligns with a corresponding hole in the bracket.

7. The mounting assembly according to claim 1, wherein the first and second holding parts have deformable formations that allow the first and second holding parts to be urged through the opening in the front side of the bracket, but prevent the first and second holding parts from being removed from the opening in the bracket.

8. The mounting assembly according to claim 1, further including
a third mounting component that engages with a third elongated member that lies generally parallel to and between the first and second elongated members, the third mounting component including:
a third containment part that defines, in conjunction with the front side of the bracket, a loop through which the third elongated member extends,
a third holding part that extends through the opening in the front side of the bracket to the rear side of the bracket, and
a fourth holding part that extends through the opening in the front side of the bracket to the rear side of the bracket, such that the third holding part and the fourth holding part extend from different sides of the third containment part.

9. A mounting assembly for mounting two generally parallel first and second elongated members, the mounting assembly comprising:
a bracket that allows the first and second elongated members to extend substantially against a front side of the bracket;
a first mounting component that engages with the first elongated member, the first mounting component including:
a first mounting part mounted to the front side of the bracket,
a first containment part that defines, in conjunction with the front side of the bracket, a loop through which the first elongated member extends, and
a first holding part that extends through an opening in the front side of the bracket to a rear side of the bracket, such that the first mounting part and the first holding part extend from different sides of the first containment part;
a second mounting component that engages with the second elongated member, the second mounting component including:
a second mounting part mounted to the front side of the bracket,
a second containment part that defines, in conjunction with the front side of the bracket, a loop through which the second elongated member extends, and
a second holding part that extends through the opening in the front side of the bracket to the rear side of the bracket, such that the second mounting part and the second holding part extend from different sides of the second containment part; and
a retaining means that includes the first and second holding parts and permanently joins the first and second holding parts on the rear side of the bracket.

10. The mounting assembly according to claim 9, wherein the first and second mounting components each include aligning formations, and
a fastening means is provided such that the fastening means is capable of being engaged with the aligning formations.

11. The mounting assembly according to claim 9, wherein a tab formation is provided on the rear side of the bracket to which the retaining means can be fastened.

12. The mounting assembly according to claim 9, wherein a hole or other formation is provided in the first and second holding parts to facilitate manipulation of the retaining means.

13. The mounting assembly according to claim 9, wherein the first and second mounting parts are configured to lie substantially flat against the front side of the bracket, and
the first and second mounting parts each include a hole such that each hole aligns with a corresponding hole in the bracket.

14. A mounting assembly for mounting two generally parallel first and second elongated members, the mounting assembly comprising:
a bracket that allows the first and second elongated members to extend substantially against a front side of the bracket;
a first mounting component that engages with the first elongated member, the first mounting component including:
a first mounting part mounted to the front side of the bracket,
a first containment part that defines, in conjunction with the front side of the bracket, a loop through which the first elongated member extends, and
a first holding part having a head that extends through an opening in the front side of the bracket to a rear side of the bracket, such that the first mounting part and the first holding part extend from different sides of the first containment part;
a second mounting component that engages with the second elongated member, the second mounting component including:
a second mounting part mounted to the front side of the bracket,
a second containment part that defines, in conjunction with the front side of the bracket, a loop through which the second elongated member extends, and
a second holding part having a head that extends through the opening in the front side of the bracket to the rear side of the bracket, such that the second mounting part and the second holding part extend from different sides of the second containment part; and
a retaining means that includes the first and second holding parts and is configured to retain the first and second holding parts on the rear side of the bracket, wherein
the opening in the bracket has a central portion through which the heads of the first and second holding parts extend, and the opening in the bracket has an outer portion with which the first and second holding parts engage, but through which the first and second holding parts cannot extend.

15. The mounting assembly according to claim 14, wherein the retaining means is spring urged to engage with the outer portion of the opening in the bracket.

16. The mounting assembly according to claim 14, wherein the central portion of the opening in the bracket is in the form of a slot.

17. The mounting assembly according to claim 14, wherein the first and second mounting components each include aligning formations, and a fastening means is provided such that the fastening means is capable of being engaged with the aligning formations.

18. The mounting assembly according to claim 14, wherein a hole or other formation is provided in the heads of the first and second holding parts to facilitate manipulation of the retaining means.

19. The mounting assembly according to claim 14, wherein the first and second mounting parts are configured to lie substantially flat against the front side of the bracket, and the first and second mounting parts each include a hole such that each hole aligns with a corresponding hole in the bracket.

20. The mounting assembly according to claim 14, wherein the first and second holding parts have deformable formations that allow the first and second holding parts to be urged through the opening in the front side of the bracket, but prevent the first and second holding parts from being removed from the opening in the bracket.

* * * * *